(12) United States Patent
Butaney et al.

(10) Patent No.: US 9,213,533 B1
(45) Date of Patent: Dec. 15, 2015

(54) DYNAMICALLY PROVISIONING DIGITAL VOICE TRUNKS

(75) Inventors: Vikas Butaney, Los Altos, CA (US);
Geng Chen, San Jose, CA (US);
Jennifer Blatnik, Los Altos, CA (US);
Jayesh Chokshi, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1673 days.

(21) Appl. No.: 11/874,149

(22) Filed: Oct. 17, 2007

(51) Int. Cl.
*G06F 9/445* (2006.01)
*H04L 29/06* (2006.01)
*H04L 29/12* (2006.01)
*H04M 7/12* (2006.01)

(52) U.S. Cl.
CPC ............. *G06F 8/61* (2013.01); *H04L 65/1053* (2013.01); *H04L 29/12066* (2013.01); *H04L 29/12113* (2013.01); *H04L 61/1511* (2013.01); *H04L 61/1529* (2013.01); *H04M 7/128* (2013.01)

(58) Field of Classification Search
CPC ............. H04L 12/56; H04L 29/12066; H04L 29/12113; H04L 61/1511; H04L 61/1529; H04M 7/0006; H04M 7/127; H04M 7/128; G06F 8/61
USPC ......................................... 370/260, 352–356
See application file for complete search history.

(56) References Cited

U.S. PATENT DOCUMENTS

| | | | |
|---|---|---|---|
| 6,463,051 B1 * | 10/2002 | Ford ............................. | 370/352 |
| 7,164,762 B2 * | 1/2007 | Hanson et al. ............ | 379/212.01 |
| 7,827,252 B2 * | 11/2010 | Hopmann et al. ............ | 709/217 |
| 2002/0029256 A1 * | 3/2002 | Zintel et al. ................... | 709/218 |
| 2003/0041125 A1 * | 2/2003 | Salomon ...................... | 709/220 |
| 2003/0072300 A1 * | 4/2003 | Kwon ........................... | 370/352 |
| 2005/0015499 A1 * | 1/2005 | Mayer .......................... | 709/228 |
| 2005/0031108 A1 * | 2/2005 | Eshun et al. ............ | 379/201.12 |
| 2005/0074026 A1 | 4/2005 | Soncodi | |
| 2005/0083922 A1 * | 4/2005 | Takai et al. ................... | 370/386 |
| 2005/0213567 A1 * | 9/2005 | Mullins et al. ................ | 370/352 |
| 2005/0235352 A1 * | 10/2005 | Staats et al. .................... | 726/14 |
| 2006/0023657 A1 * | 2/2006 | Woodson et al. ............ | 370/328 |
| 2006/0092915 A1 * | 5/2006 | Moore .......................... | 370/352 |
| 2006/0174018 A1 * | 8/2006 | Zhu et al. ..................... | 709/229 |
| 2006/0209794 A1 * | 9/2006 | Bae et al. ...................... | 370/352 |
| 2006/0236388 A1 * | 10/2006 | Ying et al. ...................... | 726/15 |
| 2007/0036143 A1 * | 2/2007 | Alt et al. ....................... | 370/352 |
| 2007/0121602 A1 | 5/2007 | Sin | |

(Continued)

OTHER PUBLICATIONS

SIP Connection. Wikipedia, the free encyclopedia. [retrieved on Sep. 11, 2008]. pp. 1. Retrieved from the Internet: <URL:http://en.wikipedia.org/wiki/SIP_connection>.

*Primary Examiner* — Melanie Jagannathan
*Assistant Examiner* — Kai Chang
(74) *Attorney, Agent, or Firm* — Hickman Palermo Becker Bingham LLP

(57) ABSTRACT

Computer systems and logic are operable to establish a local network connection to a network device; establish a remote network connection to a network service provider; create and send a message to the network service provider that requests the network service provider to provide configuration data for the network device; receive from the network service provider a network location identifier specifying a location in a network of the configuration data; download the configuration data from the network service provider by accessing the network location identifier; and install the configuration data in the network device. In one embodiment, VoIP trunk information is provisioned to an IP-PBX across a network without manual entry or long time delays.

11 Claims, 3 Drawing Sheets

(56) References Cited

U.S. PATENT DOCUMENTS

2007/0206585 A1    9/2007  Lee
2007/0211700 A1*   9/2007  Hsieh et al. .................. 370/356
2007/0217434 A1*   9/2007  Welbourn .................... 370/401
2008/0080487 A1    4/2008  Yamazaki
2008/0186958 A1*   8/2008  O'sullivan et al. ............ 370/356
2008/0215668 A1*   9/2008  Hu ............................... 709/202

* cited by examiner

DYNAMICALLY PROVISIONING DIGITAL VOICE TRUNKS

TECHNICAL FIELD

The present disclosure generally relates to management of digital voice networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Ordering, installing and configuring digital voice or voice-over-Internet Protocol (VoIP) service for a business or other organization has been a complex process. Typically the organization first orders or obtains digital voice processing equipment, such as an IP private branch exchange (IP-PBX), directly from a vendor of the equipment or through a value-added reseller (VAR) or other agent. The organization also orders one or more digital voice circuits either directly from a VoIP service provider or indirectly through the VAR. Presently extensive competition exists in the market for digital voice service, but only certain service providers offer IP voice service. Therefore, personnel in the organization are required to research various network service providers, determine which ones offer IP service in the organization's geographical area, select a service provider, undergo a credit check for the organization, execute a contract, and coordinate installation of circuits and equipment. Thus, many steps are involved.

In some cases, customers who order phone lines from traditional national telephone service providers ("incumbent" service providers) or from competitive local exchange carriers (CLECs or "challengers") do not receive the phone lines and provisioned dial plan for their phone lines for several days or weeks. Delays may arise as a result of the customer needing to coordinate installation of circuits and equipment with the service provider, a local vendor, or other parties, etc.

Further, even after a service provider installs and tests circuits at the customer's site, the customer remains responsible to connect the customer premises equipment and configure that equipment to work with the circuits. Extensive, error-prone manual configuration steps are often involved in configuring IP-PBX devices for different service providers. For example, the customer or the customer's VAR might receive a username and password for the IP-PBX to log into the service provider's servers, telephone numbers, and other information from the service provider in an electronic mail (e-mail) message or in writing in a contract. The VAR or the customer is then required to manually enter parameter values from the e-mail message into a configuration file or configuration interface of the IP-PBX, or use the parameter values in command-line interface commands for the IP-PBX. As telephony interconnects move to IP using Session Initiation Protocol (SIP) for VoIP, service providers and customers desire to reduce the time needed to provision IP/SIP Trunks.

DETAILED DESCRIPTION

Figure 1:
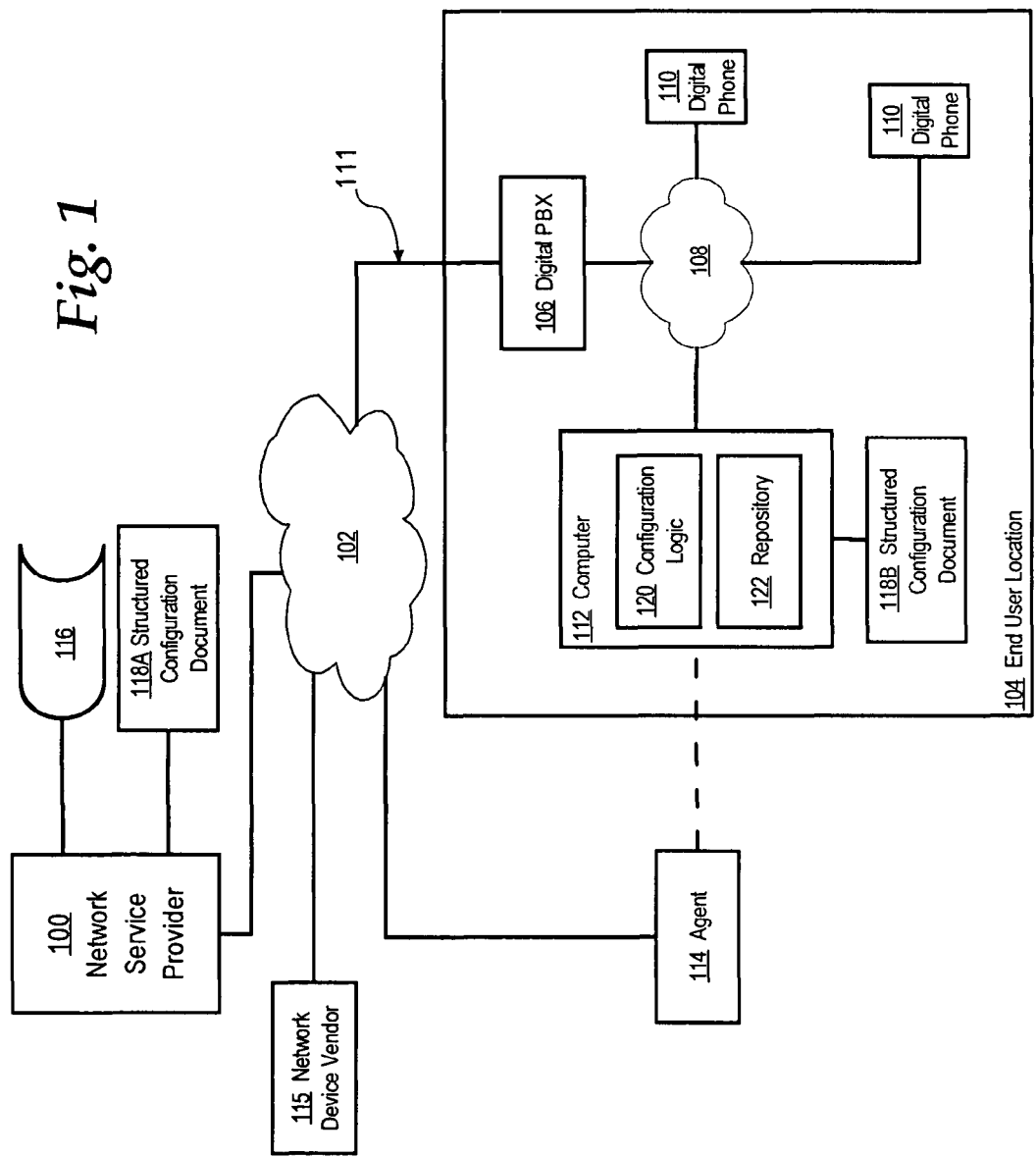
FIG. 1 illustrates an example arrangement of a network service provider, agent, and end user location that may be used in an embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives
1.0 General Overview In an embodiment, computer systems, instructions encoded on computer-readable storage media, and logic are operable to establish a local network connection to a network device; establish a remote network connection to a network service provider; create and send a message to the network service provider that requests the network service provider to provide configuration data for the network device; receive from the network service provider a network location identifier specifying a location in a network of the configuration data; download the configuration data from the network service provider by accessing the network location identifier; and install the configuration data in the network device. In one embodiment, VoIP trunk information is provisioned to an IP-PBX across a network without manual entry or long time delays.

In an embodiment, the logic is operable to parse the configuration data and to generate one or more configuration instructions for the network device.

In an embodiment, the configuration instructions specify authentication data, session initiation protocol (SIP) host information, and direct inward dialing (DID) line information for the network device, which comprises an IP-PBX that is compatible with SIP.

In an embodiment, the configuration instructions specify authentication data, media gateway control protocol (MGCP) host information, and direct inward dialing (DID) line information for the network device, which comprises an IP-PBX that is compatible with MGCP.

In an embodiment, the logic is operable to display a list of one or more available network service providers and to receive user input selecting the network service provider.

In an embodiment, the logic is operable to directly receive the configuration data from the network service provider in an electronic document without downloading.

In an embodiment, a computer-readable storage medium has encoded thereon logic which when executed by one or more processors is operable to: establish a local network connection to an Internet Protocol (IP) private branch exchange (PBX) that is logically separate from the storage medium; establish a remote network connection to a network service provider that is logically separate from the storage medium; display a list of one or more available network service providers and to receive user input selecting a particular network service provider; create and send a message to the particular network service provider that requests the particular network service provider to provide configuration data for the IP PBX; receive from the particular network service provider a Universal Resource Locator (URL) specifying a remote location in an internetwork of the configuration data; download an Extensible Markup Language (XML) file comprising the configuration data from the particular network service provider by accessing the URL; parse the XML file and generate one or more configuration instructions for the IP PBX; install the configuration instructions in the IP PBX.

In other embodiments, the invention encompasses a computer apparatus, a digital private branch exchange, and a method that implement the foregoing functions and the steps and elements shown and described herein.

2.0 Structural and Functional Overview

FIG. 1 illustrates an example arrangement of a network service provider, agent, and end user location that may be used in an embodiment. In an embodiment, a network service provider 100 is coupled to a database 116 of configuration data and can generate one or more structured configuration documents 118A. The network service provider 100 may comprise a national telephone service provider, a competitive local exchange carrier (CLEC), or other provider of voice service over digital lines. Examples of network service providers include AT&T, Verizon, Telepacific, Vonage, CBeyond, etc.

Database 116 comprises a repository of stored configuration data for network devices that use voice trunks to communicate with the service provider to receive digital voice service. The database 116 may hold configuration data for any number of network devices that the service provider supports.

Network service provider 100 is communicatively coupled to network 102, which may comprise one or more internetworks, wide area networks, metro networks, and local networks in any combination. In one embodiment, network 102 represents the collection of internetworks known as "Internet."

An end user location 104 is coupled using digital private branch exchange (PBX) 106 to network 102. The end user location 104 may comprise a business enterprise, government entity, or a facility or place associated with an individual end user, or any other institution or person. In an embodiment, the end user location 104 comprises the digital PBX 106, a local network 108, and a plurality of digital phones 110 coupled to the local network.

In an embodiment, PBX 106 is an IP-PBX that uses a voice-over-IP signaling protocol such as SIP or MGCP to communicate over VoIP trunks, which are represented by line 111. In other embodiments, PBX 106 comprises a router, switch, or other network element at an end user. Thus, digital PBX 106 in FIG. 1 broadly represents any element of network infrastructure equipment that performs digital packet switching or routing functions for data, voice, video, or other information. Trunks 111 may comprise digital voice trunks other than VoIP trunks in other embodiments, and PBX may be a non-IP digital PBX, so that embodiments are not limited to use in VoIP deployments.

In one embodiment, local network 108 comprises an Ethernet LAN, but any other local network architecture or protocols may be used.

Digital phones 110 comprise IP phones that are compatible with the PBX 106. Thus, in the arrangement of FIG. 1, a caller at one of the digital phones 110 can place a call that is routed using PBX 106 on trunk 111 using services provided by network service provider 100 to a called party who is located elsewhere in network 102.

An agent 114 is coupled to network 102. A network device vendor 115 is coupled to network 102. In an embodiment, vendor 115 makes, contracts for manufacture of, or sells the PBX 106 and may also supply or contract for the manufacture of the digital phones 110. Agent 114 represents any indirect sales partner of the vendor 115 such as a value-added reseller (VAR), system integrator, original equipment manufacturer (OEM), distributor, or other channel sales entity. In an embodiment, agent 114 acts as a sales agent of vendor 115 for PBX 106 and is responsible for directly supplying, installing and configuring the PBX in the end user location 104. Agent 114 also may act as a sales agent for VoIP service or other services that the network service provider 100 delivers. Agent 114 may contract with others or supervise others in performing such actions.

Structured configuration document 118A comprises an electronic representation of configuration data for one particular network device of one customer or end user of the service provider. Generating configuration document 118A is described further in other sections herein. In an embodiment, document 118A is an Extensible Markup Language (XML) document that is formatted according to a schema that is defined by vendor 115, either independently or in coordination with network service provider 100. The schema ensures that the XML document contains configuration parameters that are compatible with both the trunk configuration of the network service provider 100 and the system requirements of vendor 115 for PBX 106.

At a time when PBX 106 is installed in the end user location 104, agent 114 can access the end user location and connect a computer 112, which is owned or controlled by the agent 114, to local network 108. In an embodiment, computer 112 comprises configuration logic 120, which implements some of the functions described in connection with FIG. 2 and other sections of this description. The configuration logic 120 also may implement other functions such as saving configurations for PBX 106 and other PBX units of other end users or customers of the agent 114, backing up configurations, implementing two-phase commit for configuration data, such as by maintaining a configuration in a suspended state to be applied to the PBX when a submit button is clicked, etc.

The computer 112 may be a laptop or other portable computer that a representative of the agent 114 brings to the end user location 104 after circuits have been installed for the purpose of configuring the PBX 106 to operate with the circuits of the service provider 100, and removes from the end user location after the PBX has been configured.

In an embodiment, vendor 115 creates and provides a copy of the configuration logic 120 to agent 114. This approach enables vendor 115 to ensure that configuration commands and other output of the configuration logic are compatible with PBX 106. In one embodiment, configuration logic 120 is integrated into one or more products that are commercially available from Cisco Systems, Inc., San Jose, Calif., such as Cisco Unified Communications 500 Series Call Manager Express.

Computer 112 also comprises a configuration repository 122 that stores base VoIP trunk configuration data for trunk configurations and protocols that are used by network service provider 100 and for other network service providers, if any, for which agent 114 acts as a sales agent. Repository 122 may comprise any convenient form of data storage including a database, flat file(s), structured document(s), schemas, etc. In an embodiment, computer 112 receives a structured configuration document 118B as part of performing the functions, as further described below.

Alternatively, configuration logic 120 and repository 122 may be implemented within digital PBX 106. In such an embodiment, PBX 106 may also comprise an HTTP server that can communicate with a web browser application in the computer 112 over network 108.

Figure 2:
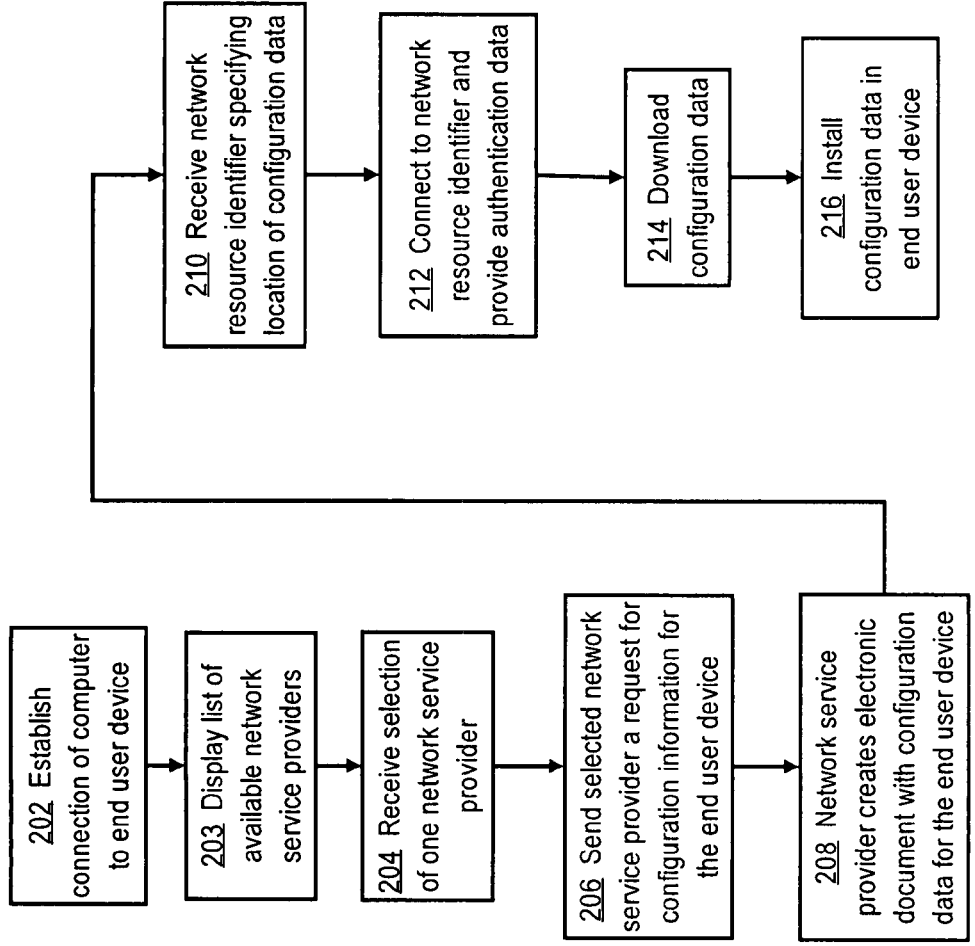
FIG. 2 illustrates a process of dynamically provisioning digital voice trunks.

FIG. 2 illustrates a process of dynamically provisioning digital voice trunks. For purposes of illustrating a clear example, FIG. 2 is now described with reference to elements of FIG. 1, but the general approach of FIG. 2 can be applied in many other embodiments or alternatives to FIG. 1.

In one embodiment, a process begins at step 202 in which a connection of a computer is established to an end user device. For example, computer 112 establishes a connection through local network 108 to PBX 106. In some embodiments, PBX 106 hosts an HTTP server and a web-based configuration application, and computer 112 communicates with the PBX using HTTP and HTML. In one alternative, PBX 106 hosts a console interface or terminal server and computer 112 submits configuration commands to the PBX using a command-line interface. Step 202 also may involve establishing connectivity of the computer 112 to network 102 so that the computer can communicate with network service provider 100.

Typically, step 202 is performed when the end user has purchased or obtained the PBX 106 and is ready to complete installation or configuration of the PBX.

In step 203, optionally, the process displays a list of available network service providers. For example, configuration logic 120 executing on computer 112 generates and displays a list of network service providers for which the agent 114 is an authorized sales agent. The list may be displayed in a graphical user interface (GUI) that the configuration logic 120 generates. The list may include service provider 100 and other service providers.

Using this approach, an individual affiliated with the agent can show the list of service providers to a representative of the end user and can recommend the selection of a particular service provider or compare information about various service providers. One benefit of this approach is that the end user is not required to perform advance manual research about a large number of potential service providers to determine which service provider has service available and is suitable for the end user. Because the present VoIP market involves numerous service providers, including so-called Tier 1 SPs, Tier 2 and Tier 3 SPs, and VAR-branded SPs, the time savings offered by the present approach can be considerable.

In step 204, a selection of one network service provider is received. For example, user input is received that selects service provider 100 from a pull-down menu in the GUI of the configuration logic 120. As a result, the configuration logic 120 in computer 112 is informed about a selection of a service provider that will communicate calls on trunks 111 to the PBX 106.

The list of service providers provides a form of advertising or marketing for the service providers, because an end user may be presented with an option to select a service provider that the end user might not have otherwise considered for service. In an embodiment, a service provider that is selected at step 204 may remit a fee or commission to the VAR for having successfully sold service to the end user on behalf of the service provider.

In an embodiment, optionally, user input is received that specifies an account held at the service provider 100 and associated with the end user. For example, when the end user orders VoIP service from service provider 100, in connection with ordering, contract review or credit check processes, the service provider establishes an account having a unique name for the end user to collect and store administrative information, billing information, and circuit information associated with the end user. The end user may also select a password for the account at the service provider. The end user or the agent may provide the account name and password to the configuration logic 120, which stores the account information transiently for use in subsequent communications with the service provider.

In step 206, the process sends the selected network service provider a request for configuration information for the end user device. In an embodiment, configuration logic 120 generates and sends a request through networks 108, 102 to network service provider 100 and requests the network service provider to provide trunk configuration information for PBX 106 of the particular end user location 104. The request may include the account name of the end user so that the service provider 100 can locate correct information for that end user. The request may identify the agent for purposes of recording a sale of service completed by the agent so that the agent can be compensated by a fee or commission. The configuration logic 120 or repository 122 are previously configured with data indicating what kind of account management tool or service is used at each particular service provider, and how to contact that account management tool or service. Requests sent from configuration logic 120 to the service provider 100 are performed in accordance with such data.

The request may comprise an HTTP request that configuration logic 120 directs to a configuration server at network service provider 100. The request also may comprise an FTP request, a request in a format agreed upon by the network service provider 100 and the vendor 115 or agent 114, etc. Alternatively, Web Services communications may be used.

In step 208, the network service provider creates an electronic document that contains configuration data for the end user device. The order of step 208 in the process of FIG. 2 is not critical; for example, the electronic document referenced in step 208 also could be created at the time that an end user places an order for trunk service, e.g., earlier than step 202 or any other step of FIG. 2.

In an embodiment, logic at network service provider 100 retrieves configuration data from database 116 and transforms the configuration data into a structured configuration document 118A that reflects particular trunk parameter values for the particular PBX 106 of the end user location 104. The document 118A is stored on a server associated with the network service provider 100 that is remotely accessible using a network protocol. For example, the network protocol is HTTP and the network service provider generates and stores a URL indicating a location of the configuration document 118A.

The parameter values in one document 118A will be different than the values for any other PBX in other locations or for other customers. In an embodiment for use with SIP trunks, the document 118A includes: a username with which the PBX 106 can log into a VoIP server of the service provider 100; a password for logging in; a set of direct inward dialing (DID) telephone numbers that can be configured on the PBX for outside callers to use to reach digital phones 110; and host information such as network address, SIP proxy address, SIP registrar address, outbound proxy address, etc. In embodiments that are used with protocols other than SIP, such as MGCP, the document 118A may include different parameter values.

In step 210, a network resource identifier is received specifying the location of the configuration data. For example, configuration logic 120 of computer 112 receives a URL in an HTML document from the service provider 100 indicating that the structured configuration document 118A was created and is available for download at the location specified in the URL. Alternatively, the service provider 100 returns a complete copy of the structured configuration document 118A in an HTTP response to the computer 112.

In step 212, the process connects to the network resource identifier and provides agent authentication data. For example, computer 112 connects through networks 108, 102 to an HTTP server of the network service provider 100 and provides the received URL as the network resource identifier. The network service provider 100 may elect to store the structured configuration document 118A in a secure location and therefore logic at the service provider may prompt the computer 112 to provide authentication data such as a username and password. Since the agent 114 is acting as a sales agent for services of the network service provider 100, the agent can select and register a password with the network service provider in advance, or the network service provider can assign a password to the agent and deliver the password to the agent outside the process shown in FIG. 2.

Network security protocols such as Secure Sockets Layer (SSL) or TLS may be used to protect the connection of the computer 112 to the network service provider 100.

In step 214, the configuration data is downloaded. For example, a user of the computer 112 selects the received URL and initiates a file download operation. Alternatively, computer 112 may issue a Web Services request to a logic module at network service provider 100 that implements Web Services. As a result, a copy of structured configuration document 118A is received through networks 102, 108 and stored at computer 112 as indicated by structured configuration document 118B.

In step 216, the configuration data is installed in the end user device. For example, configuration logic 120 causes configuration data represented in the structured configuration document 118B to be installed in PBX 106. In various embodiments, configuration logic 120 can display the configuration data in a GUI panel and request confirmation from a user of the computer 112. The confirmation is provided, for example, by a user selecting a CONFIGURE button or the equivalent. Alternatively, the configuration logic can perform automatic validation of the configuration data and submit the configuration data to the PBX 106 automatically.

Step 214 or step 216, or another step, may comprise parsing the structured configuration document 118B to extract configuration parameter values, and transforming the configuration parameter values into one or more configuration commands for the PBX 106. Alternatively, the configuration parameter values are automatically filled into a form that the configuration logic 120 generates for display to the user before sending the configuration data to the PBX. The user is not required to manually fill in the form or type configuration data values.

Step 216 also may comprise generating one or more command-line interface (CLI) commands containing the configuration data for transmission from the computer 112 to the PBX 106. Additionally or alternatively, configuration data may be communicated to the PBX 106 using Simple Network Management Protocol (SNMP) operations.

As a result, the PBX 106 becomes configured with correct configuration data for operation using trunks 111 with network service provider 100, automatically, without the end user having to research service providers or determine configuration parameters for the PBX.

In an embodiment, structured configuration document 118B is stored only transiently in memory of the computer 112 and removed from that computer when step 216 is completed successfully. A transient storage approach is considered conservative and less likely to result in the disclosure of confidential information, and less likely to confuse personnel of the agent if they visit several different locations or different end users in the same day or other time period. Alternatively, structured configuration document 118B or the transformed configuration data can be stored persistently in repository 122 or another location on computer 112. Additionally or alternatively, structured configuration document 118B or the transformed configuration data can be stored persistently in data storage in the PBX or in a computer of the end user.

Various embodiments provide any of a number of benefits over prior approaches. For example, accuracy is improved because the configuration parameters that are stored in the PBX are assured to match requirements of the service provider. Speed of installation is improved dramatically because the end user is not required to coordinate an exchange of information among the end user, agent, and network service provider. In certain embodiments, trunk configuration can be performed in a matter of minutes once the computer 112 is connected to the PBX because far less troubleshooting is necessary. As a result, the agent can complete more equipment configuration visits at more customers or end users in a given time period, which may increase revenue and efficiency of the agent.

The end user and agent are not required to know or determine the correct configuration parameters for the PBX. The end user and agent are not required to read parameter values from paper, eliminating errors arising from the end user or agent attempting to read documents in which parameter values are not legible. Manual configuration of the PBX, and the potential for typographical errors or other errors introduced by manual configuration, are eliminated. The resulting accuracy of configuration variables increases the likelihood that service is established flawlessly when the PBX is activated and users attempt to place calls.

Further, the service provider shares trunk configuration information dynamically because the specific configuration information that appears in a structured configuration document can change or be different for each different customer or for different geographical regions in which service is provided.

Embodiments may be used by agents such as a value-added reseller (VAR), system integrator, original equipment manufacturer (OEM), distributor, or other channel sales entity, or service providers, etc., to quickly and accurately configure the VoIP trunk services for end customers. Embodiments may be integrated into tools that are used for installation, configuration, or provisioning by any of the foregoing parties.

3.0 Implementation Mechanisms—Hardware Overview

Figure 3:
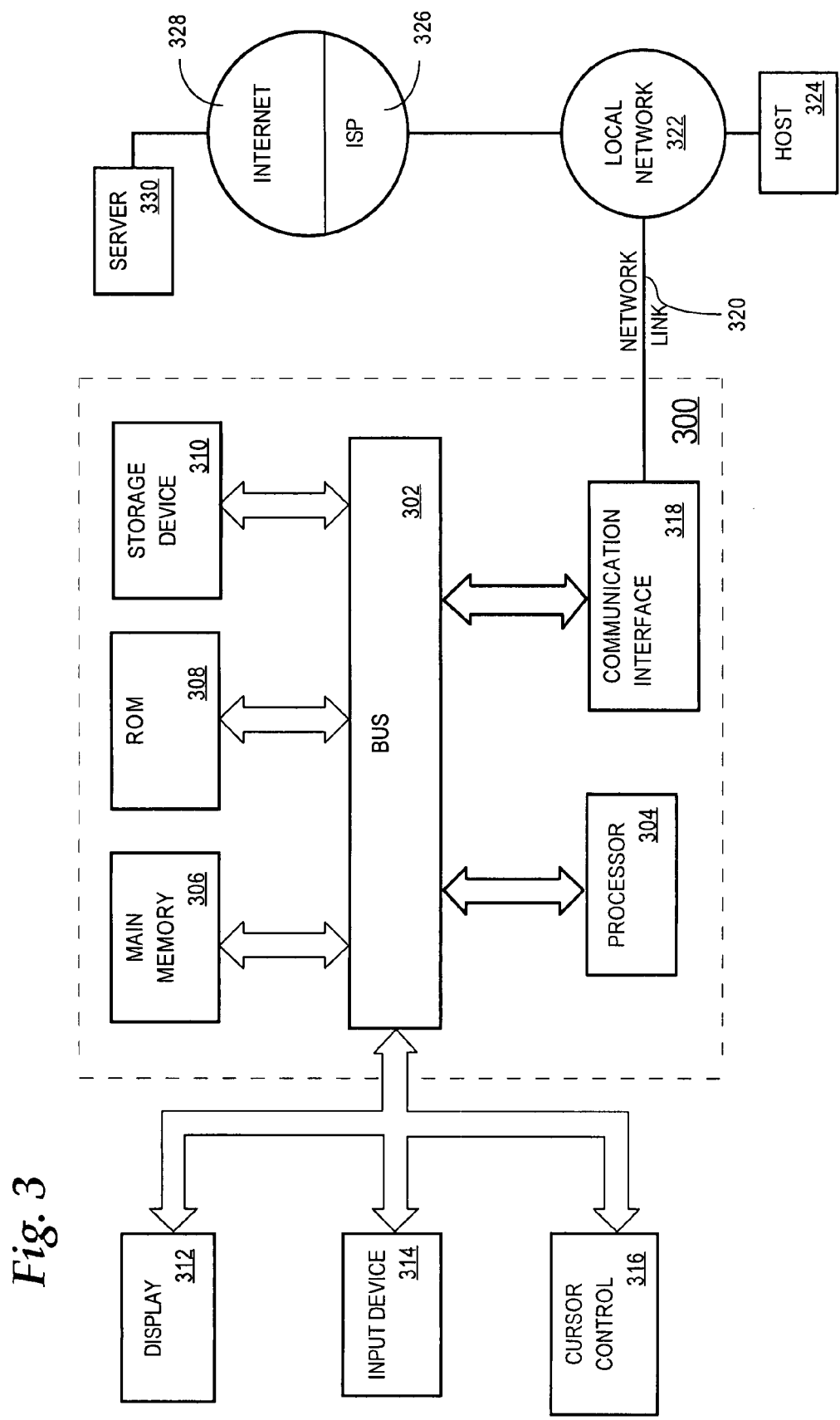
FIG. 3 illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

4.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium having encoded thereon logic which when executed by one or more processors is operable to:
   cause an end-user computer to:
      establish a local network connection from an end-user computer to a network device;

wherein the network device is un-configured for providing voice services of a network service provider via the network device;

establish a remote network connection from the end-user computer to the network service provider;

create and send a message from the end-user computer to the network service provider to request the network service provider to provide configuration data for configuring the voice services on the network device;

in response to sending the message to the network service provider, receive at the end-user computer from the network service provider a network location identifier specifying a location in a network of the configuration data for configuring the voice services on the network device;

download to the end-user computer the configuration data from the location specified by the network location identifier;

parse, at the end-user computer, the configuration data to generate, at the end-user computer, one or more configuration instructions for the network device;

wherein the configuration instructions specify at least authentication data;

install, by executing the one or more configuration instructions, the configuration data in the network device to configure the network device for providing the voice services via the network device.

2. The computer-readable storage medium of claim 1, wherein the configuration instructions specify session initiation protocol (SIP) host information, and direct inward dialing (DID) line information for the network device, which comprises an IP-PBX that is compatible with SIP.

3. The computer-readable storage medium of claim 1, wherein the configuration instructions specify media gateway control protocol (MGCP) host information, and direct inward dialing (DID) line information for the network device, which comprises an IP-PBX that is compatible with MGCP.

4. The computer-readable storage medium of claim 1, further comprising logic which when executed by one or more processors is operable to display a list of one or more available network service providers and to receive user input selecting the network service provider.

5. A digital private branch exchange, comprising:
a call switching system;
one or more processors coupled to the call switching system;
a non-transitory computer-readable storage medium having encoded thereon logic which when executed by the one or more processors is operable to:
cause an end-user computer to:
establish a remote network connection from the end-user computer to a network service provider;
create and send a message from the end-user computer to the network service provider to request the network service provider to provide configuration data for configuring voice services on the digital private branch exchange to enable the voice services from the network service provider to a plurality of users via the digital private branch exchange;
in response to sending the message to the network service provider, receive at the end-user computer from the network service provider a network location identifier specifying a location in a network of the configuration data for configuring the voice services on the digital private branch exchange;

download to the end-user computer the configuration data from the location specified by the network location identifier;

parse, at the end-user computer, the configuration data to generate, at the end-user computer, one or more configuration instructions for the digital private branch exchange;

wherein the configuration instructions specify at least authentication data;

install, by executing the one or more configuration instructions, the configuration data in the digital private branch exchange to enable voice communications between the users via the digital private branch exchange.

6. The digital private branch exchange of claim 5, wherein the configuration instructions specify session initiation protocol (SIP) host information, and direct inward dialing (DID) line information for the digital private branch exchange, which comprises an IP-PBX that is compatible with SIP.

7. The digital private branch exchange of claim 5, wherein the configuration instructions specify media gateway control protocol (MGCP) host information, and direct inward dialing (DID) line information for the digital private branch exchange, which comprises an IP-PBX that is compatible with MGCP.

8. The digital private branch exchange of claim 5, further comprising logic which when executed by one or more processors is operable to display a list of one or more available network service providers and to receive user input selecting the network service provider.

9. A non-transitory computer-readable storage medium having encoded thereon logic which when executed by one or more processors is operable to:
cause an end-user computer to:
establish a local network connection from the end-user computer to an Internet Protocol (IP) private branch exchange (PBX) that is logically separate from the storage medium and needs to be configured to enable voice services from one or more network service providers to a plurality of users via the IP PBX;
establish a remote network connection from the end-user computer to a network service provider that is logically separate from the storage medium;
display a list of the one or more network service providers and to receive user input selecting a particular network service provider;
create and send a message from the end-user computer to the particular network service provider to request the particular network service provider to provide configuration data for configuring the voice services on the IP PBX;
in response to sending the message to the particular network service provider, receive at the end-user computer from the particular network service provider a Universal Resource Locator (URL) specifying a remote location in an internetwork of the configuration data for configuring the voice services;
download to the end-user computer an Extensible Markup Language (XML) file comprising the configuration data from the remote location specified by the particular network service provider in the URL;
parse, at the end-user computer, the XML file and generate, at the end-user computer, one or more configuration instructions for the IP PBX;
wherein the configuration instructions specify at least authentication data;

install, by executing the one or more configuration instructions, the configuration instructions in the IP PBX to enable voice communications between the users via the IP PBX.

10. The computer-readable storage medium of claim 9, wherein the configuration instructions specify session initiation protocol (SIP) host information, and direct inward dialing (DID) line information for the IP PBX, which comprises an IP-PBX that is compatible with SIP.

11. The computer-readable storage medium of claim 9, wherein the configuration instructions specify media gateway control protocol (MGCP) host information, and direct inward dialing (DID) line information for the IP PBX, which comprises an IP-PBX that is compatible with MGCP.

* * * * *